United States Patent [19]
Ramirez de Agudelo et al.

[11] Patent Number: 5,242,483
[45] Date of Patent: Sep. 7, 1993

[54] PROCESS FOR THE PRODUCTION OF VANADIUM-CONTAINING STEEL ALLOYS

[75] Inventors: Maria M. Ramirez de Agudelo, Los Teques; Carlos Seaton, Caracas; Maria I. Specht, San Antonio, all of Venezuela

[73] Assignee: Intevep, S.A., Caracas, Venezuela

[21] Appl. No.: 924,957

[22] Filed: Aug. 5, 1992

[51] Int. Cl.$^5$ .................... C22B 34/22; C22C 33/08
[52] U.S. Cl. ........................ 75/507; 75/314; 75/622
[58] Field of Search ................ 75/314, 622, 507

[56] References Cited

U.S. PATENT DOCUMENTS

| | | | |
|---|---|---|---|
| 3,334,992 | 8/1967 | Downing | 75/314 |
| 4,167,409 | 9/1979 | Downing | 75/622 |
| 4,396,425 | 8/1983 | Faulring | 75/314 |

*Primary Examiner*—Peter D. Rosenberg
*Attorney, Agent, or Firm*—Bachman & LaPointe

[57] ABSTRACT

A process for production of vanadium-containing agglomerate, includes the steps of providing a spent, vanadium-containing, iron based hydroconversion catalyst; incinerating the spent catalyst in the presence of an oxidizer until a sulfur content of the spent catalyst is reduced to 2% or less by weight; grinding the spent catalyst to a particle size suitable for a desired use; and mixing the spent catalyst with an iron mineral and a binder to form a vanadium-containing agglomerate; and pyroconsolidating the vanadium-containing agglomerate. Agglomerates so obtained exhibit a solid solution structure of ferric oxide and vanadium pentoxide. A process for production of vanadium-containing steel alloys from such agglomerates includes the steps of: reducing the vanadium-containing agglomerate; mixing the reduced vanadium-containing agglomerate with a standard reduced iron agglomerate to obtain a mixed reduced agglomerate; and melting the mixed reduced agglomerate under reducing conditions to obtain a vanadium-containing steel alloy.

26 Claims, 4 Drawing Sheets

PROCESS FOR THE PRODUCTION OF VANADIUM-CONTAINING STEEL ALLOYS

BACKGROUND OF THE INVENTION

The present invention relates to a process for obtaining a vanadium-containing steel alloy for use in, e.g., steel making procedures.

More particularly, the vanadium-containing steel alloy is obtained using an iron based spent hydroconversion catalyst as the source of vanadium for the vanadium-containing steel alloy.

A significant aspect of the steel making industry is the addition of various chemical elements to the molten metal bath in order to obtain improved mechanical properties, corrosion resistance, and reactivity, as well as various other desired properties of the resulting alloyed steel.

These various chemical elements are normally added to the molten steel as an iron alloy because the melting point of the iron alloy is lower than the melting point of the pure metal.

One of the frequently used elements in steel production is vanadium. Vanadium is normally incorporated into steel as a strengthening agent by adding the vanadium to the molten bath of steel in the form of ferrovanadium.

A common procedure for obtaining ferrovanadium comprises the steps of reducing vanadium oxide with aluminum or silicon in the presence of iron in an electric furnace. Such a procedure may, more specifically, include the reduction of vanadium pentoxide fines with iron scraps or oxides and aluminum powder which are mixed together with a basic oxide such as calcium oxide and heated to ignition.

U.S. Pat. No. 4,165,234 to Kostyanoi et al. discloses a process for producing ferrovanadium alloys. Kostyanoi teaches the process of starting with a ferrovanadium slag; melting the slag; reducing the slag with a ferrosilicium and aluminum composition; removing slag from the reduced mixture; purging the remaining melt with oxygen to obtain a composition in the melt of 35% vanadium pentoxide as slag; discharging the remaining metal melt; and reducing the 35% vanadium pentoxide to obtain ferrovanadium.

DD-256685-A discloses an extraction wherein an iron-containing vanadium salt solution is processed by spent catalyst leaching to yield starting material (pure vanadium) for ferrovanadium production.

Various other processes for obtaining vanadium-containing steel have been disclosed offering advantages such as increased degree of assimilation of vanadium, increased quality of the metal, reduction in time required for the procedures, economical starting materials, enhanced open-hearth furnace productivity, and starting materials with high purity and low residual elements.

For example, U.S. Pat. No. 4,526,613 discloses a procedure for producing vanadium-containing alloys wherein the starting material is a pure vanadium trioxide which results in fewer impurities being imparted to the end product. Other procedures such as those listed above are disclosed in the following patents: SU 1194905-A, SU 1235968-A, SU 1407961 and SU 1097682.

Of the above, important advantages can be obtained through providing economically obtained starting materials. Accordingly, the process of the present invention discloses the use, as a starting material, of a spent iron based catalyst which has been used, for example, in a hydroconversion process for heavy hydrocarbon feedstocks. These spent catalysts typically have, as a result of the hydroconversion, large percentages of vanadium, as well as, less desirably, significant amounts of sulfur and coke.

Accordingly, a principal object of the present invention is to provide a vanadium-containing agglomerate which can be used in making steel alloys.

It is a further object of the present invention to provide a process for manufacturing such an agglomerate from a spent hydroconversion catalyst.

It is still another object of the present invention to provide a procedure whereby the so obtained agglomerate can be processed to obtain a vanadium-containing steel alloy.

It is a further object of the present invention to provide a useful application for the aforesaid spent catalyst which avoids economically and environmentally expensive disposal alternatives.

Further objects and advantages of the present invention will appear hereinbelow.

SUMMARY OF THE INVENTION

The aforesaid objects and advantages of the present invention are obtained by a process for production of vanadium-containing agglomerates, comprising the steps of providing a spent, vanadium-containing, iron based hydroconversion catalyst; incinerating the spent catalyst in the presence of an oxidizer until a sulfur content of the spent catalyst is reduced to 2% or less by weight; grinding the spent catalyst to a particle size suitable for a desired use; mixing the spent catalyst with an iron mineral and a binder to form a vanadium-containing agglomerate; and pyroconsolidating the vanadium-containing agglomerate.

When analyzed by analytical electron microscopy (AEM), vanadium compounds contained in such a vanadium-containing agglomerate exhibit a structure corresponding to a solid solution of ferric oxide and vanadium pentoxide having a chemical composition generalized as $xFe_2O_3 \, yV_2O_5$, and evidenced by particle micrograph, electron diffractogram and chemical analysis as more fully described below.

During the procedure, the grinding of the spent catalyst should be continued until a particulate material is obtained which is suitable for the desired end use, wherein the particulate material is agglomerated with a binder into, for example, the form of pellets, briquettes or sinters which allow easy adjustment of the amount of vanadium to be added to the final steel product.

A typical spent catalyst for use in the proposed procedure will preferably have an iron content, measured as iron oxide, of 20–99% by weight, and a vanadium content, measured as vanadium pentoxide, of 0.2–10% by weight. Less desirably, the spent catalyst will be likely to have a significant content of sulfur. For this reason, the catalyst is incinerated and oxidized in order to reduce the sulfur content to acceptable levels, namely 2% or less, and more preferably 1% or less by weight.

The vanadium-containing agglomerate may then, according to the invention, be further processed to obtain vanadium-containing steel alloys, according to a process comprising the steps of: reducing the vanadium-containing agglomerate to obtain a reduced vanadium-containing agglomerate; mixing the reduced vanadium-containing agglomerate with a standard reduced iron agglomerate to obtain a mixed reduced agglomerate; and melting the mixed reduced agglomerate under reducing conditions to obtain a vanadium-containing steel alloy.

The above step of mixing the reduced vanadium-containing agglomerate with the standard reduced iron agglomerate can be preferably carried out at a ratio by weight of vanadium agglomerate to iron agglomerate of 1:10–1:0.

Thus disclosed is a procedure for providing economically attractive starting materials for the production of vanadium-containing steel alloys which can then be used to advantage in numerous known steel making procedures. Further, a use is provided for spent iron based hydroconversion catalysts which would otherwise require costly and environmentally unattractive disposal.

BRIEF DESCRIPTION OF THE DRAWING

A detailed description of the invention follows, with reference to the accompanying drawing, wherein.

DETAILED DESCRIPTION

Figure 1:
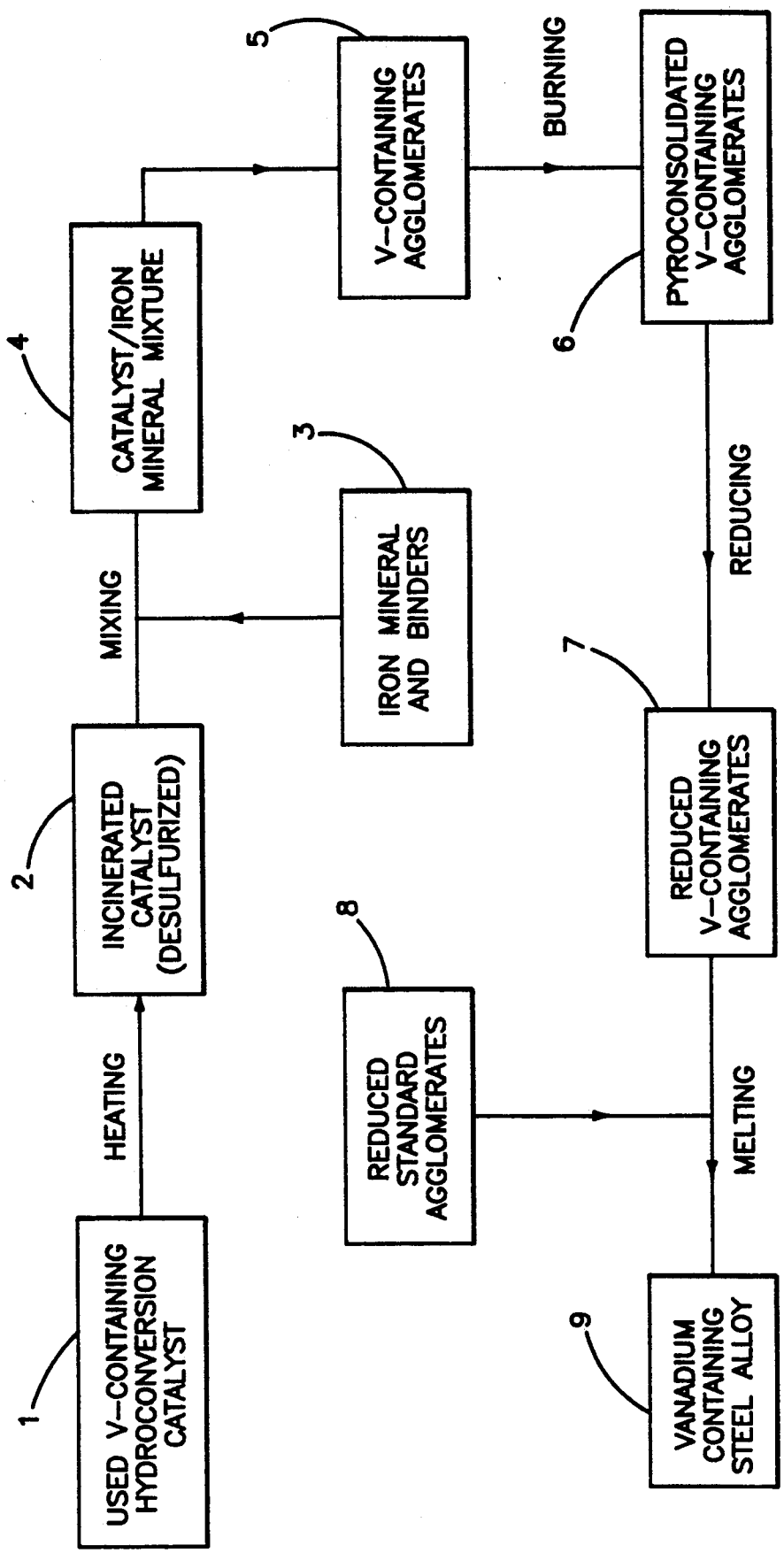
FIG. 1 is a block diagram illustrating the various steps of the procedure according to the invention.

With reference to FIG. 1, the process for the production of vanadium-containing steel alloys comprises the steps of: providing a spent vanadium-containing iron based hydroconversion catalyst (1), incinerating the spent catalyst in the presence of an oxidizer until the sulfur content is reduced to acceptable levels, preferably 2% or less and more preferably still, 1% or less (2), grinding the spent catalyst to a desired particle size, mixing the spent catalyst with an iron mineral and a binder to form a vanadium-containing agglomerate (3–5), and pyroconsolidating the vanadium-containing agglomerate (6).

Figure 2:
FIG. 2 is a particle micrograph of a catalyst particle.
Figure 3:
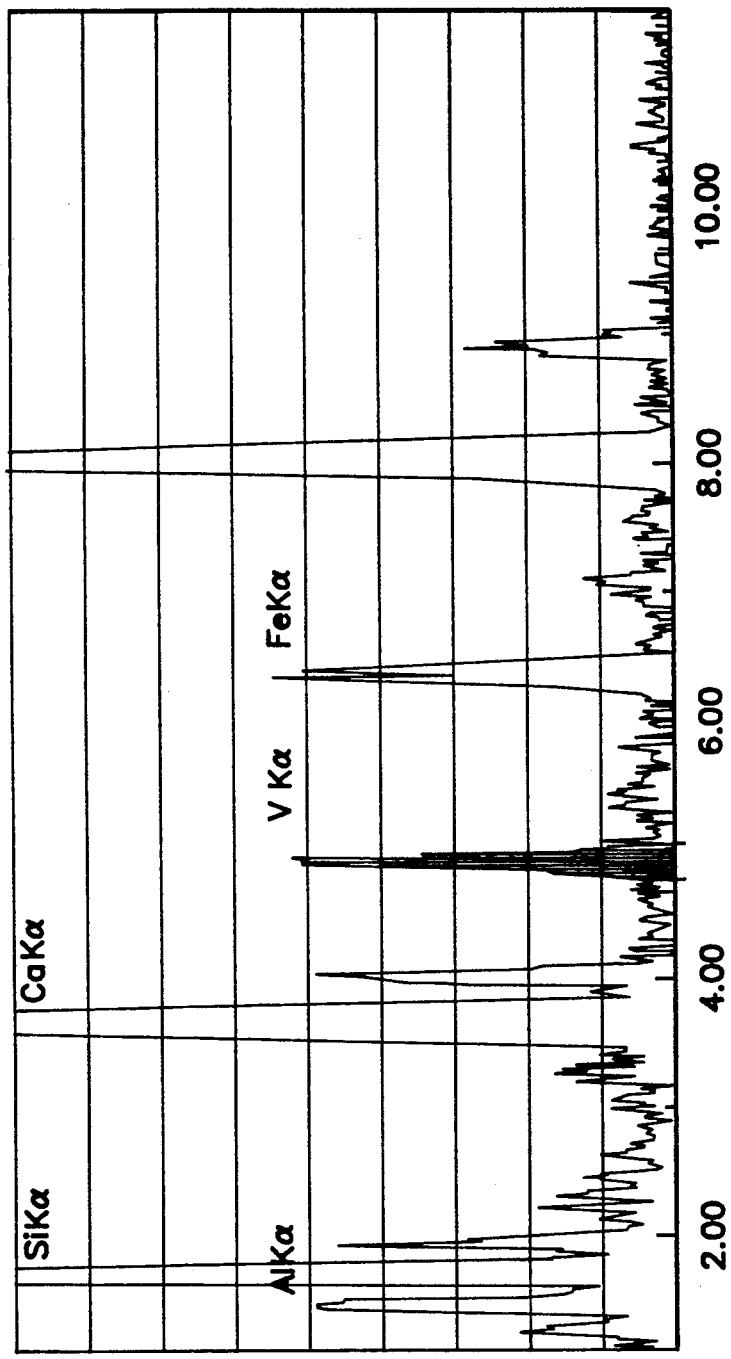
FIG. 3 is a chemical analysis of the particle of FIG. 2.

The pyroconsolidated agglomerate so obtained contains vanadium compounds in a form best described as a solid solution of ferric oxide and vanadium pentoxide. A particle of such a pyroconsolidated agglomerate is shown in FIG. 2, which particle has a chemical composition as shown in FIG. 3. In this agglomerate, vanadium remains in a common matrix with the iron. This agglomerate exhibits a chemical composition generalized as $xFe_2O_3 \, yV_2O_5$, which can be evidenced by the electron diffractogram shown in FIG. 4.

With further reference to FIG. 1, the pyroconsolidated vanadium-containing agglomerate can then be treated to obtain vanadium-containing steel alloys by a process comprising the steps of: reducing the vanadium-containing agglomerate (7), mixing the reduced vanadium-containing agglomerate with a standard reduced iron agglomerate (8) and melting the mixture under reducing conditions to obtain a vanadium-containing steel alloy (9).

As previously mentioned, the spent catalyst is preferably one which has been used in a hydroconversion process for the treatment of heavy hydrocarbon feedstocks, the spent catalyst having an iron content as ferric oxide in the range of 20–99% by weight, and having an accumulated vanadium content, measured as vanadium pentoxide, of 0.2–10% by weight. Regarding the upper range of vanadium content, a higher content would naturally be desirable but is not reasonably to be expected.

According to a preferred embodiment of the invention, the spent vanadium-containing iron based catalyst is incinerated at a temperature of 400°–1200° C., and more preferably at a temperature of 700°–1000° C., in the presence of an oxidant which may be selected from a group consisting of air, oxygen or mixtures of air and oxygen, in order to desulfurize the spent catalyst until obtaining a sulfur level of 2% or less. More preferably, the desulfurization is continued to a sulfur level of 1% or less.

The incinerated spent catalyst is then ground to a particle size which is suitable for agglomerating. At this juncture, the particle size should be selected depending on the preferred form of the end agglomerate. Such forms may include, for example, pellets, briquettes or sinters.

The ground particulate spent catalyst is, in the preferred embodiment, then admixed with a selected raw iron mineral to obtain a mixture having a content of spent catalyst of less than or equal to 75%, preferably less than or equal to 50%. However, 100% spent catalyst without raw iron addition may be further processed. The iron mineral which is mixed with the spent catalyst and the binder can be any available iron mineral which may be normally used in the steel industry. The binder may suitably be selected from, for example, calcium hydroxide, bentonite or lime.

Figure 4:
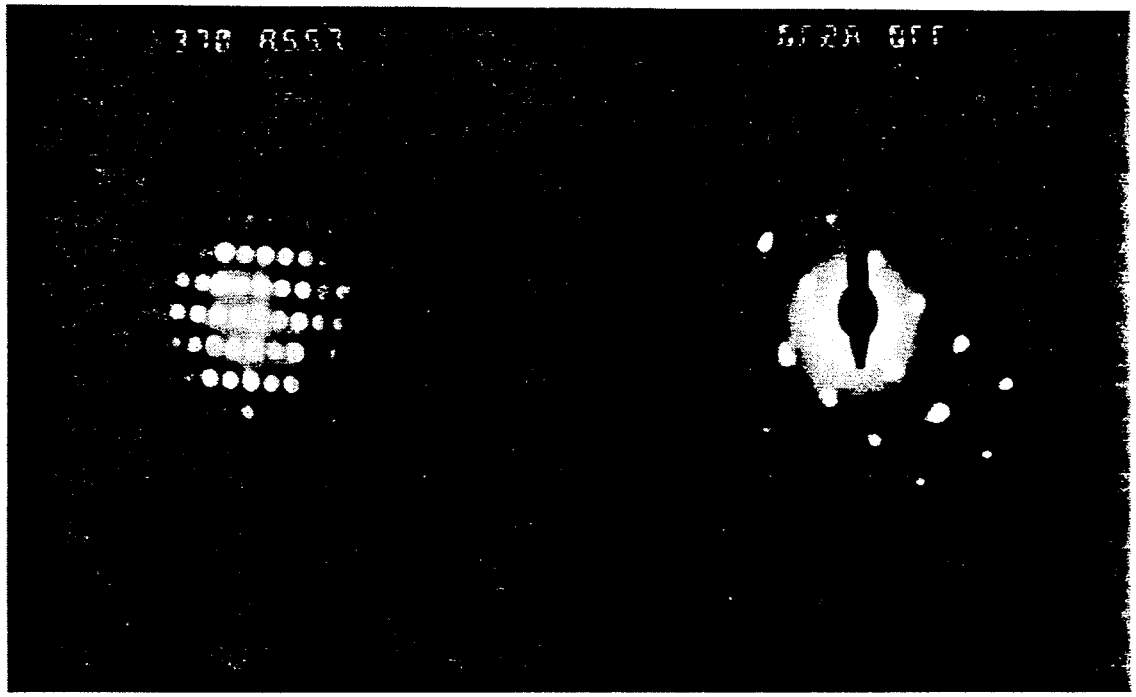
FIG. 4 is an electron diffractogram of the particle of FIG. 2, showing a vanadium compound in the vanadium containing agglomerate obtained according to the invention.

The mixture is then agglomerated in the desired form and subjected to standard pyroconsolidation techniques. It is at this stage in particular that the vanadium has been found to remain in the iron matrix as previously set forth, and as illustrated in FIG. 4.

In order to prepare a vanadium-containing steel alloy, the pyroconsolidated vanadium-containing agglomerate is then reduced to obtain a reduced vanadium-containing agglomerate. The reduction is preferably carried out in the presence of hydrogen and carbon monoxide under standard reduction conditions. The reduced vanadium containing agglomerate is then mixed with a standard reduced iron agglomerate in a ratio of vanadium agglomerate to iron agglomerate of 1:10–1:0. This ratio should be selected depending upon the desired composition of the ending vanadium steel alloy. This mixture of vanadium agglomerate and iron agglomerate is then melted, preferably at a temperature in the range of 1500°–1700° C., and under reducing conditions in the melt, to obtain a vanadium-containing steel alloy. It is important to maintain the reducing conditions during the melting procedure, as the content of vanadium in the end product significantly decreases under oxidizing conditions. Thus, the melting is conducted in a reducing atmosphere, and the melt itself is maintained in a reducing environment. This importance is illustrated below by a comparison between the results of Example 1 and Example 2.

Use of this procedure has demonstrated that steel alloys can be prepared from this procedure containing approximately 60% of the vanadium which was introduced at the beginning of the procedure in the spent catalyst. It is apparent, therefore, that the present invention discloses an economically beneficial and desirable use for spent hydroconversion catalysts, and also provides an economically advantageous source of vanadium for use in steel making procedures.

The procedure according to the invention will be further illustrated in the following examples.

Example 1

This example demonstrates the transfer of vanadium from the aforesaid spent catalyst to a vanadium-containing steel alloy which is useful, as previously described, in the steel making industry.

For the purpose of this example, the spent hydroconversion catalyst is a naturally occurring iron mineral, which was used as a catalyst in a hydroconversion of heavy oils, and which has a chemical composition as set forth below in Table I.

TABLE I

| Fe | (wt. %) | 44.5 |
|---|---|---|
| S | (wt. %) | 21.3 |
| C | (wt. %) | 30.6 |
| V | (ppm) | 9968 |
| Ni | (ppm) | 1984 |
| Si | (ppm) | 4797 |
| Al | (ppm) | 8142 |

The raw iron mineral which was used was a hematite coming from Cerro Bolivar, Estado Bolivar, in southern Venezuela.

The spent catalyst and iron mineral were ground to a particulate material suitable for pelletization, and then mixed to obtain a mixture of 50% of each component. This particulate mixture was then pelletized and burned. The obtained pyroconsolidated pellets were then reduced by standard reduction techniques, and the reduced vanadium-containing pellets having a vanadium content of 0.22 wt. % were mixed with reduced standard iron containing pellets in a V-pellets to standard pellets ratio of 1:5. Carbon was introduced in an amount sufficient to insure a reduced molten bath. This mixture was then introduced into a 75 kilowatt induction furnace, and fusion was carried out at 1600° C. The chemical composition of the alloy which was obtained was measured from samples taken at 0, 10 and 25 minutes of treatment of the molten bath. These compositions are set forth below in Table II (wt. %).

TABLE II

| t (min) | 0 | 10 | 25 |
|---|---|---|---|
| C | 3.81 | 4.14 | 4.32 |
| S | 0.026 | 0.025 | 0.023 |
| Ni | 0.094 | 0.093 | 0.093 |
| V | 0.024 | 0.027 | 0.033 |

As can be seen from Table II, recovery of vanadium increased with time. Recovery percentages of vanadium according to this procedure are in the range of 60%.

Example 2

This example will demonstrate the detrimental effects of allowing oxidizing conditions during the end melting process. As previously indicated, the conditions during this melting process should be reducing. For the purposes of this example, the same procedure was used as was used in Example 1, but iron oxide was added to provide oxidizing conditions. The resulting chemical compositions, taken at 0, 10 and 20 minutes, are shown below in Table III (wt. %).

TABLE III

| t (min) | 0 | 10 | 25 |
|---|---|---|---|
| C | 1.46 | 0.029 | 0.009 |
| S | 0.025 | 0.024 | 0.024 |
| Ni | 0.096 | 0.10 | 0.091 |
| V | 0.017 | 0.011 | 0.009 |

As can be seen from consideration of the above table, oxidizing conditions during the melting step result in a recovery of vanadium which decreases with time. Also, the overall recovery is reduced from 60% obtained in Example I to only 16% under oxidizing conditions. The importance of the reduction conditions during the melting step can therefore be appreciated.

This invention may be embodied in other forms or carried out in other ways without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. A process for production of a vanadium-containing agglomerate, comprising the steps of:
   providing a spent, vanadium-containing, iron based hydroconversion catalyst;
   incinerating the spent catalyst in the presence of an oxidizer until a sulfur content of the spent catalyst is reduced to about 2% or less by weight;
   grinding the spent catalyst to a desired particle size to obtain a ground spent catalyst;
   mixing the ground spent catalyst with an iron containing material and a binder to form a vanadium-containing agglomerate; and
   pyroconsolidating the vanadium-containing agglomerate to obtain a pyroconsolidating vanadium-containing agglomerate comprising vanadium compounds as a solid solution of ferric oxide and vanadium pentoxide.

2. A process for production of a vanadium-containing steel alloy comprising the steps of:
   providing a pyroconsolidated vanadium-containing agglomerate comprising vanadium compounds as a solid solution of ferric oxide and vanadium pentoxide;
   reducing the pyroconsolidated vanadium-containing agglomerate to obtain a reduced vanadium-containing agglomerate;
   mixing the reduced vanadium-containing agglomerate with a standard reduced iron agglomerate to obtain a mixed reduced agglomerate; and
   melting the mixed reduced agglomerate under reducing conditions to obtain a vanadium-containing steel alloy.

3. A process for production of vanadium-containing steel alloys, comprising the steps of:
   providing a spent, vanadium-containing, iron based hydroconversion catalyst;
   incinerating the spent catalyst in the presence of an oxidizer until a sulfur content of the spent catalyst is reduced to about 2% or less by weight;
   grinding the spent catalyst to a desired particle size to obtain a ground spent catalyst;
   mixing the ground spent catalyst with an iron containing material and a binder to form a vanadium-containing agglomerate;

pyroconsolidating the vanadium-containing agglomerate to obtain a pyroconsolidating vanadium-containing agglomerate comprising vanadium compounds as a solid solution of ferric oxide and vanadium pentoxide;

reducing the vanadium-containing agglomerate to obtain a reduced vanadium-containing agglomerate;

mixing the reduced vanadium-containing agglomerate with a standard reduced iron agglomerate to obtain a mixed reduced agglomerate; and melting the mixed reduced agglomerate under reducing conditions to obtain a vanadium-containing steel alloy.

4. A process according to claim 3, comprising providing the spent catalyst having a composition of iron of about 20–99% by weight of $Fe_2O_3$.

5. A process according to claim 4, further comprising providing the spent catalyst having a composition of vanadium of about 0.2–10% by weight of $V_2O_5$.

6. A process according to claim 4, further comprising providing the spent catalyst having composition of vanadium of about 0.5–5% by weight of $V_2O_5$.

7. A process according to claim 3, further including mixing the spent catalyst with the iron mineral in a percentage by weight of spent catalyst up to about 50%.

8. A process according to claim 3, further comprising selecting the binder from a group consisting of calcium hydroxide, bentonite or lime.

9. A process according to claim 3, further comprising mixing the reduced vanadium-containing agglomerate with the standard reduced iron agglomerate in a ratio of vanadium agglomerate to iron agglomerate by weight of about 1:10–1:0.

10. A process according to claim 3, further comprising melting the mixed reduced agglomerate under reducing conditions at a temperature of about 1500°–1700° C.

11. A process according to claim 3, further comprising incinerating the spent catalyst and oxidizing said spent catalyst until said spent catalyst has a composition of sulfur of about 1% or less by weight.

12. A process according to claim 3, further comprising incinerating the spent catalyst at a temperature of about 400°–1200° C.

13. A process according to claim 3, further comprising incinerating the spent catalyst at a temperature of about 700°–1000° C.

14. A process according to claim 3, further comprising selecting the oxidizer from a group consisting of oxygen, and mixtures of air and oxygen.

15. A vanadium-containing agglomerate for use in manufacturing steel alloys, comprising vanadium compounds as a solid solution of ferric oxide and vanadium pentoxide and having a chemical composition (wt. %) as follows:

Fe 40–70
V 0.01–10
Ni 0.01–2
Mg 0.01–3
Ca 0.01–5
Si 0.01–5
Al 0.01–5
S $\leq$ 2

16. A process for production of vanadium-containing steel alloys, comprising the steps of:

providing a spent, vanadium-containing, iron based hydroconversion catalyst;

incinerating the spent catalyst in the presence of an oxidizer until a sulfur content of the spent catalyst is reduced to about 2% or less by weight;

pyroconsolidating the incinerated vanadium-containing spent catalyst; and reducing the pyroconsolidated vanadium-containing spent catalyst to obtain a reduced vanadium-containing agglomerate comprising vanadium compounds as a solid solution of ferric oxide and vanadium pentoxide.

17. A process for production of vanadium-containing steel alloys, comprising the steps of:

providing a spent, vanadium-containing, iron based hydroconversion catalyst;

incinerating the spent catalyst in the presence of an oxidizer until a sulfur content of the spent catalyst is reduced to about 2% or less by weight;

pyroconsolidating the incinerated vanadium-containing spent catalyst;

reducing the pyroconsolidated vanadium-containing spent catalyst to obtain a reduced vanadium-containing agglomerate comprising vanadium compounds as a solid solution of ferric oxide and vanadium pentoxide;

mixing the reduced vanadium-containing agglomerate with a standard reduced iron agglomerate to obtain a mixed reduced agglomerate; and melting the mixed reduced agglomerate under reducing conditions to obtain a vanadium-containing steel alloy.

18. A process according to claim 17, comprising providing the spent catalyst having a composition of iron of about 20–99% by weight of $Fe_2O_3$.

19. A process according to claim 18, further comprising providing the spent catalyst having a composition of vanadium of about 0.2–10% by weight of $V_2O_5$.

20. A process according to claim 18, further comprising providing the spent catalyst having composition of vanadium of about 0.5–5% by weight of about $V_2O_5$.

21. A process according to claim 17, further comprising mixing the reduced vanadium-containing agglomerate with the standard reduced iron agglomerate in a ratio of vanadium agglomerate to iron agglomerate by weight of about 1:10–1:0.

22. A process according to claim 17, further comprising melting the mixed reduced agglomerate under reducing conditions at a temperature of about 1500°–1700° C.

23. A process according to claim 17, further comprising incinerating the spent catalyst and oxidizing said spent catalyst until said spent catalyst has a composition of sulfur of about 1% or less by weight.

24. A process according to claim 17, further comprising the spent incinerating catalyst at a temperature of about 400°–1200° C.

25. A process according to claim 17, further comprising incinerating catalyst at a temperature of about 700°–1000° C.

26. A process according to claim 17, further comprising selecting the oxidizer from a group consisting of oxygen, and mixtures of air and oxygen.

* * * * *